United States Patent
Ohbitsu

(10) Patent No.: US 8,634,697 B2
(45) Date of Patent: Jan. 21, 2014

(54) SOUND SIGNAL CONTROL DEVICE AND METHOD

(75) Inventor: Toshiro Ohbitsu, Kawasaki (JP)

(73) Assignee: Futjitsu Limited, Kawasaki (JP)

( * ) Notice: Subject to any disclaimer, the term of this patent is extended or adjusted under 35 U.S.C. 154(b) by 915 days.

(21) Appl. No.: 12/727,508

(22) Filed: Mar. 19, 2010

(65) Prior Publication Data

US 2010/0172633 A1     Jul. 8, 2010

Related U.S. Application Data

(63) Continuation of application No. PCT/JP2007/069053, filed on Sep. 28, 2007.

(51) Int. Cl.
   *H04N 5/92*     (2006.01)

(52) U.S. Cl.
   USPC ........................................... 386/239

(58) Field of Classification Search
   USPC ........................................... 386/239
   See application file for complete search history.

(56) References Cited

U.S. PATENT DOCUMENTS

| | | | |
|---|---|---|---|
| 2007/0031119 A1* | 2/2007 | Iwanaga | 386/95 |
| 2009/0002556 A1* | 1/2009 | Manapragada et al. | 348/575 |

FOREIGN PATENT DOCUMENTS

| | | |
|---|---|---|
| EP | 0727780 A2 | 8/1996 |
| JP | 6-337696 | 12/1994 |
| JP | 7-79411 | 3/1995 |
| JP | 7-212319 | 8/1995 |
| JP | 8-55384 | 2/1996 |
| JP | 2004-214902 | 7/2004 |

OTHER PUBLICATIONS

International Preliminary Report on Patentability, mailed May 14, 2010, in corresponding PCT Application No. PCT/JP2007/069053 (5 pp.).
European Search Report dated Dec. 8, 2011 issued in corresponding European Patent Application No. 07828794.3.
International Search Report, mailed Dec. 4, 2007, in corresponding International Application No. PCT/JP2007/069053 (2 pp.).

* cited by examiner

*Primary Examiner* — Thai Tran
*Assistant Examiner* — William Tran
(74) *Attorney, Agent, or Firm* — Staas & Halsey LLP

(57) ABSTRACT

A sound signal control device includes a change determining unit to determine a change of a reproduction speed of input data containing a moving picture signal and a sound signal; a changeover detecting unit to detect, as a changeover timing, a period in which a degree of coincidence of a moving picture is equal to or larger than a predetermined value when the change determining unit determines the change to a different reproduction speed during the reproduction; a reproducing unit to reproduce a sound and the moving picture based on the input data and, when the change determining unit determines the change of the reproduction speed, changing over the reproduction speed at the changeover timing; and a sound control unit to mute a sound output based on the sound signal at the changeover timing.

12 Claims, 14 Drawing Sheets

FIG. 5

| CASE OF NOT EXECUTING SUBSTITUTE DATA GENERATING PROCESS | | CASE OF EXECUTING SUBSTITUTE DATA GENERATING PROCESS | |
|---|---|---|---|
| NFORMATION QUANTITY PER BLOCK (APPARENT SPEED WHEN REPRODUCED) | | NFORMATION QUANTITY PER BLOCK (APPARENT SPEED WHEN REPRODUCED) | |
| 1 (ESSENTIAL SPEED) | N1 | M1 = (N1+N2)/3 | (1+1)/3 = 2/3 |
| 1 (ESSENTIAL SPEED) | N2 | M2 = (N1+N2)/3 | (1+1)/3 = 2/3 |
| 1 (ESSENTIAL SPEED) | N3 (crossed out) | M3 = (N1+N2)/3 | (1+1)/3 = 2/3 |
| 1 (ESSENTIAL SPEED) | N4 | M4 = (M2+M3+N4)/3 | (2/3+2/3+1)/3 = 7/9 |
| 1 (ESSENTIAL SPEED) | N5 | M5 = (M3'+M4+N5)/3 | (7/9+7/9+1)/3 = 23/27 |
| 1 (ESSENTIAL SPEED) | N6 | M6 = (M4'+M5+N6)/3 | (23/27+23/27+1)/3 = 73/81 |
| 1 (ESSENTIAL SPEED) | N7 | M7 = (M5'+M6+N7)/3 | (73/81+73/81+1)/3 = 227/243 |
| | | N7 | ← CHANGEOVER<br>1 (ESSENTIAL SPEED) | t ↓

SOUND SIGNAL CONTROL DEVICE AND METHOD

CROSS-REFERENCE TO RELATED APPLICATION

This is a continuation of Application PCT/JP2007/069053, filed on Sep. 28, 2007, now pending, the contents of which are herein wholly incorporated by reference.

FIELD

The embodiment relates to a technology of controlling a sound output when reproducing a moving picture.

BACKGROUND

In the case of reproducing the moving picture in a way that changes a speed to a variable speed and a slow speed other than a 1× speed, the sound output is controlled corresponding to this moving picture. Therefore, the sound output is controlled to get back to a normal status also in the case of returning (changing over) the reproduction speed to the 1× speed from the variable speed. At this time, if a volume and a sound frequency largely fluctuate, noises are produced in some cases.

For avoiding the occurrence of the noises, a technique is proposed, which executes the changeover till waiting for a mute period in the case of changing over the reproduction speed.

Further, a technology disclosed in the following patent documents is given as the related art related to the embodiment of the present application.
[Patent document 1]
Japanese Laid-Open Patent Publication No. 2004-214902
[Patent document 2]
Japanese Laid-Open Patent Publication No. 06-337696
[Patent document 3]
Japanese Patent Laid-Open Publication No. 07-212319

SUMMARY

In the case of changing over the reproduction speed till waiting for the mute period as described above, however, in the normal moving picture, BGM (Back Ground Music) and an effect sound flow without any intermission, there is a rare case in which a perfectly mute state comes out, and hence such a problem arises that the changeover can not be conducted at proper timing.

The embodiment adopts the following aspects in order to solve the problems given above. Namely, according to an aspect of the embodiment, a sound signal control device includes: a change determining unit to determine a change of a reproduction speed of input data containing a moving picture signal and a sound signal; a changeover detecting unit to detect, as a changeover timing, a period in which a degree of coincidence of a moving picture is equal to or larger than a predetermined value when the change determining unit determines the change to a different reproduction speed during the reproduction; a reproducing unit to reproduce a sound and the moving picture based on the input data and, when the change determining unit determines the change of the reproduction speed, changing over the reproduction speed at the changeover timing; and a sound control unit to mute a sound output based on the sound signal at the changeover timing.

The detecting unit may detect, if the degree of coincidence is equal to or larger than the predetermined value by making a comparison between the frames ranging from an Nth frame to an (N+x)th frame posterior to a predetermined frame counted from the Nth frame in the moving picture signal, a range from an (N+1)th frame to the (N+x)th frame as the changeover timing.

When the change determining unit determines a change to a 1× speed from the reproduction speed less than the 1× speed or a change to the 1× speed from the reproduction speed exceeding the 1× speed, the sound control unit may mute the sound output.

The sound signal control device may further include: a missing data detecting unit to detect missing data of the input data; and a substitute data generating unit to generate substitute data by averaging the input data defined as, if the missing data detecting unit detects the missing data of the input data, at least any one of the input data anterior to a missing frame which excludes the frame with the missing data being detected and the input data posterior to the missing frame into data for reproduction time obtained by adding the reproduction time related to the input data to the reproduction time related to the missing frame, wherein when the detecting unit detects the missing data of the input data, the change determining unit determines a change to the reproduction speed less than the 1× speed, and the reproducing unit may reproduce the sound and the moving picture based on the image signal and the substitute data, and when the detecting unit comes to detect none of the missing data of the input data, the change determining unit may determine a change to the 1× reproduction speed.

According to the embodiment, there is provided a sound signal control method by which a reproducing device of a sound and a moving picture executes: determining a change of a reproduction speed of input data containing a moving picture signal and a sound signal; detecting, as a changeover timing, a period in which a degree of coincidence of the moving picture is equal to or larger than a predetermined value when determining the change to a different reproduction speed during the reproduction; reproducing the sound and the moving picture based on the input data and, when determining the change of the reproduction speed, changing over the reproduction speed at the changeover timing; and muting a sound output based on the sound signal at the changeover timing.

In the sound signal control method, wherein if the degree of coincidence is equal to or larger than the predetermined value by making a comparison between the frames ranging from an Nth frame to an (N+x)th frame posterior to a predetermined frame counted from the Nth frame in the moving picture signal, a range from an (N+1)th frame to the (N+x)th frame may be detected as the changeover timing.

In the sound signal control method, if the reproduction speed is changed to a 1× speed from the reproduction speed less than the 1× speed or to the 1× speed from the reproduction speed exceeding the 1× speed, the sound output may be muted.

The sound signal control method may further include: detecting missing data of the input data; and generating substitute data by averaging the input data defined as, if detecting the missing data of the input data, at least any one of the input data anterior to a missing frame which excludes the frame with the missing data being detected and the input data posterior to the missing frame into data for reproduction time obtained by adding the reproduction time related to the input data to the reproduction time related to the missing frame, wherein when detecting the missing data of the input data, a change to the reproduction speed less than the 1× speed may be determined, and the sound and the moving picture may be reproduced based on the image signal and the substitute data, and when coming to detect none of the missing data of the input data, a change to the 1× reproduction speed may be determined.

Further, an aspect of the embodiment may also be a sound signal control program making a computer execute the sound signal control method. Still further, an aspect of the embodiment may also be a recording medium recorded with the sound signal control program that can be read by the computer. The computer is made to read and execute the program on the recording medium, thereby enabling the functions thereof to be provided.

Herein, the recording medium readable by the computer connotes a recording medium capable of storing information such as data, programs, etc. electrically, magnetically, optically, mechanically or by chemical action, which can be read from the computer and so on. Among these recording mediums, for example, a flexible disc, a magneto-optic disc, a CD-ROM, a CD-R/W, a DVD, a DAT, an 8 mm tape, a memory card, etc. are given as those demountable from the computer.

Further, a hard disc, a ROM (Read-Only Memory), etc. are given as the storage mediums fixed within the computer.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram illustrating the substitute data generating process in the embodiment.

In a device for reproducing a moving picture based on input data including a moving picture signal and a sound (voice) signal, there is a case of performing a changeover to a variable speed other than a 1× speed such as fast-forwarding and frame-by-frame playback during reproduction of the moving picture. In this case, the sound signal is also controlled in a way that matches with the variable speed of the moving picture. For example, a period of reproduction time is extended by elongating the sound if the reproduction speed is less than the 1× speed but is shortened by omitting a mute (silent) period if the reproduction speed is equal to or larger than the 1× speed, thus conducting the control for matching with the moving picture. Therefore, in the case of changing the reproduction speed, a sound (voice) noise might occur due to an abrupt change in a sound state before and after being changed.

Herein, a sound pop noise which occurs due to the abrupt change of the reproduction speed will hereinafter be described with reference to FIG. 11. It should be noted that in the following discussion, the sound signal may be any type of sound signals, however, it is general that a human voice is a principal element in TV broadcasting etc, and BGM (Back Ground Music) and an effect sound are defined as integrated acoustic elements (audio elements), and hence the sound signal is also referred to as a voice signal or an audio signal for the convenience' sake. Similarly, the sound based on the sound signal is also termed the voice or the audio element.

Figure 11:
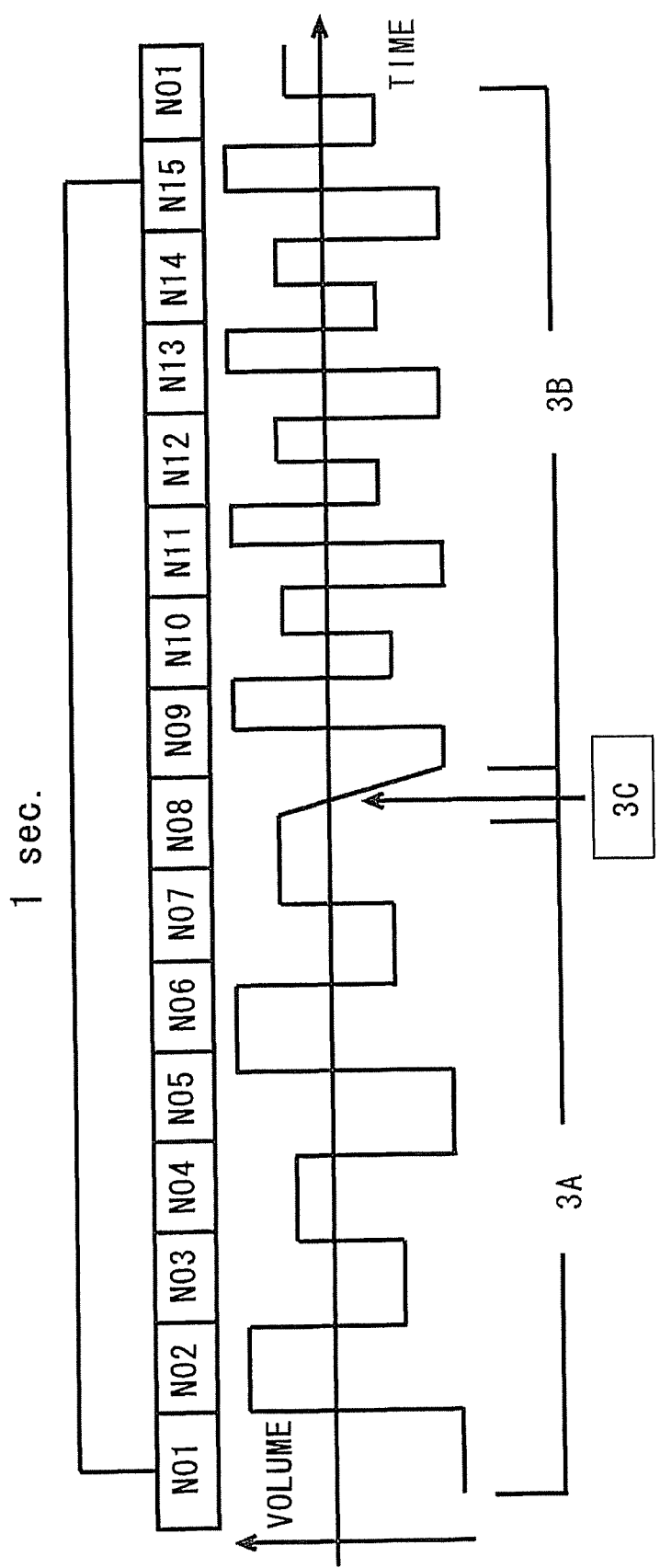
FIG. 11 is an explanatory diagram of a cause of occurrence of a voice pop noise.

In FIG. 11, a period 3A represents an area (frames) where the reproduction is done at a speed as low as less than the 1× speed, and a period 3B indicates the frames in which the regular reproduction is carried out at the 1× speed. A symbol "Nxx" represents frames N01-N15 for 1 sec.

Figure 12A:
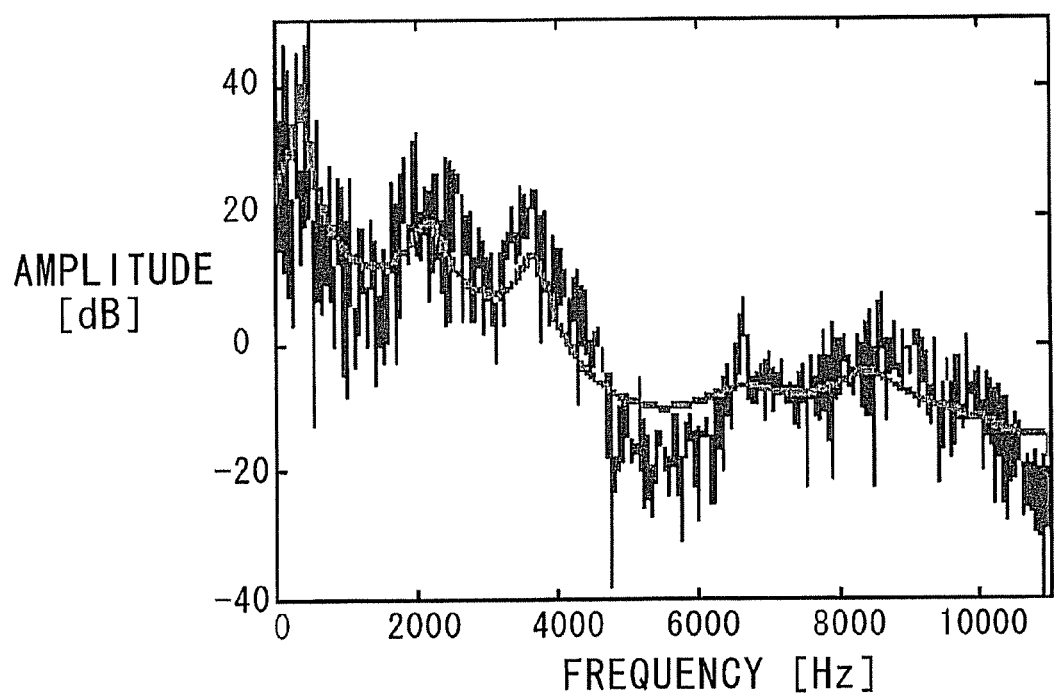
FIG. 12A is an explanatory diagram of the cause of the occurrence of the voice pop noise.
Figure 12B:
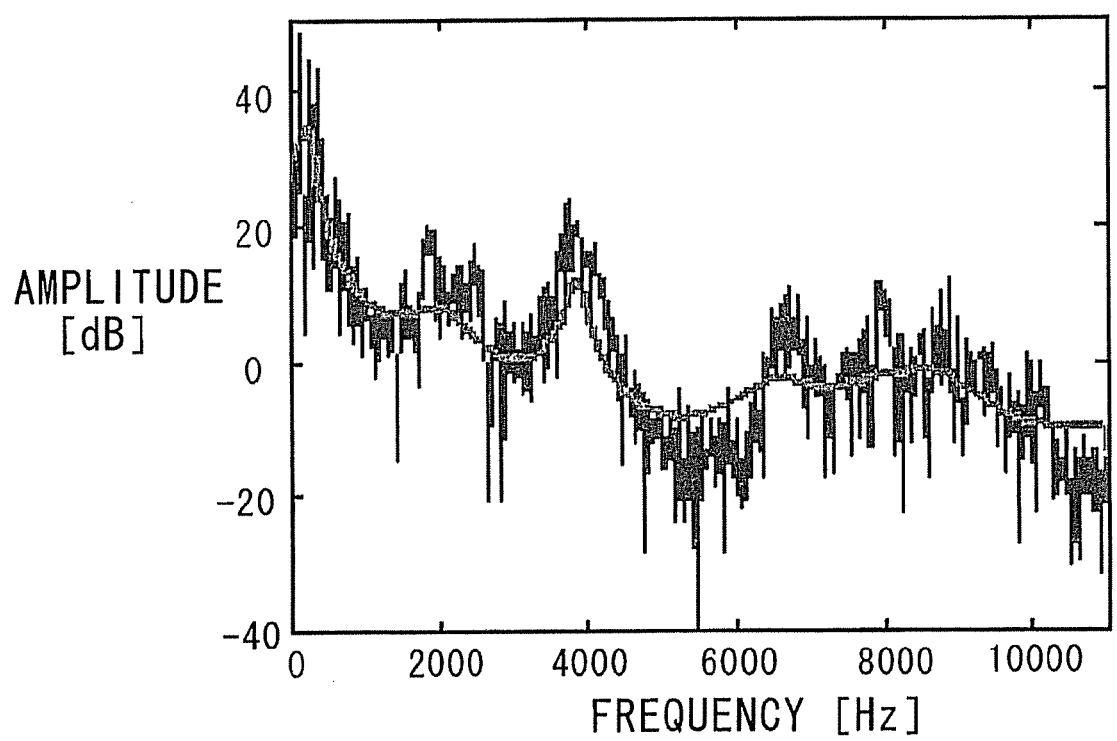
FIG. 12B is an explanatory diagram of the cause of the occurrence of the voice pop noise.

In the period 3A, the voice is reproduced by decreasing a frequency in a way that sets the voice reproduction speed to be less than the 1× speed, or alternatively the voice is reproduced without changing the frequency by sampling the voice on a predetermined unit and elongating the reproduction time on a per unit basis. In any case, the voice in the period 3A and the voice in the period 3B present different states. FIGS. 12A and 12B illustrate a difference between a frequency of the voice reproduced at a ½× speed and a frequency of the voice reproduced at the normal speed (1× speed). In FIGS. 12A and 12B, the axis of abscissas represents the frequency, while the axis of ordinates indicates amplitude (loudness) (dB) of the voice.

Then, let "3C" be a point at which the reproduction changes to the 1× speed from this less-than-1× speed. Namely, the frequency of the voice is abruptly changed at the point 3C. A conventional scheme is that the voice is not muted in this period. Hence, a large difference between the voice levels occurs. A gap between the frequencies appears to be a change in tone quality, and the gap in decibel [dB] appears to be a change in volume. Accordingly, these elements, when occurring for a certain duration, are heard as voice noises.

Figure 1:
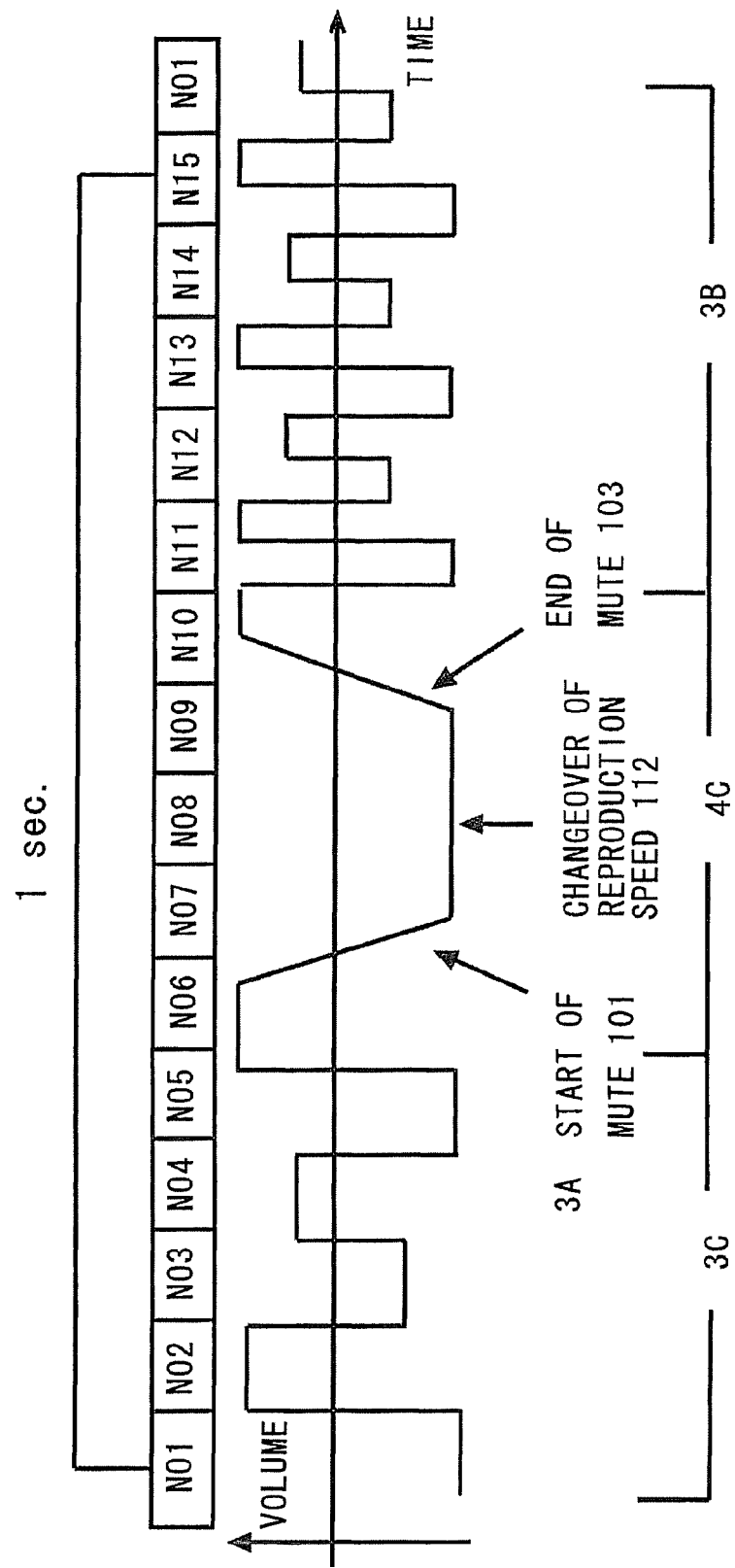
FIG. 1 is a diagram illustrating a configuration of the embodiment.

Such being the case, a scheme of the embodiment involves restraining the noises by muting the voice output when changing over the reproduction speed as illustrated in FIG. 1. FIG. 1 is an explanatory diagram illustrating a configuration of the embodiment.

To start with, on the occasion of reproducing the moving picture based on the input data, the change of the reproduction speed is determined by a user's operation or by a device. For example, the changeover from the variable speed to the 1× speed is determined.

In this case, a period 4C having a degree of coincidence, equal to or larger than a predetermined value, of the respective frames (dynamic images) forming the moving picture is detected by searching for the input data. Thus, if the similar frames are consecutive, it can be analogized that the voice continues in the same state with a small change, and therefore this point is set as a changeover timing of the reproduction speed.

Then, the voice is muted and the reproduction speed is changed over at this changeover timing. This muting and the changeover of the reproduction speed involve, a depicted in FIG. 1, muting the voice while gradually decreasing the level on a time base at a mute start time 101. Consequently, the mute state does not abruptly come out, with the result that the voice noises do not occur due to this process.

Thereafter, the reproduction speed is changed over 102, and the mute is canceled 103 by gradually increasing the voice level.

At this changeover timing, there is coincidence of a predetermined number or more of frames between an Nth frame and frames ranging from an (N+1)th frame to an (N+5)th frame (N06-N10 in FIG. 1), and therefore neither an acoustic pressure nor the frequency fluctuates abruptly. Namely, herein, the same scene continues, so that there is no changeover of a violent sound such as an explosion sound. Hence, any sense of discomfort does not arise when viewing the moving picture even by creating a temporary mute zone with an application. Consequently, the mute is start and canceled for a short period of time, and operations thereof are not recognized as noises.

Therefore, according to the embodiment, the reproduction speed can be properly changed over while restraining the noises from occurring.

The coincidence of the predetermined number or more of the dynamic images described herein is not a determined value but what is set based on a reproduction content by an application (voice control program) designer.

For instance, the respective frames forming the moving picture are compared on a per-pixel basis, the determination is made depending on whether a predetermine value (90% in this example) or more of pixels are coincident or not. Namely, if there continues the picture of which the degree of coincident is equal to or larger than 90%, the reproduction speed is changed over to 1× speed.

The following is a description of an embodiment in the case of carrying out the embodiment by way of a computer (personal computer) including a function of viewing a digital TV (one-segment 1-seg)) broadcast. Configurations in the following embodiment are exemplifications, and the embodiment is not limited to the following configurations.

The 1-seg broadcasting involves using H.264/AVC (Advanced Video Coding) (level 1.2, 320×240 or 320×180, a minimum frame interval 1/15 sec) as a compression encoding method of moving picture data. This method adopts picture generation based on interframe prediction as a method of generating a picture from the compressed moving picture data.

Figure 13:
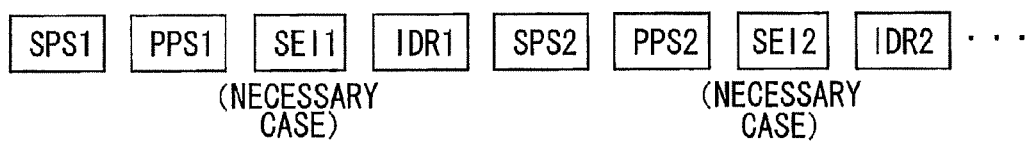
FIG. 13 is a diagram illustrating a data structure of H.264/AVC.

FIG. 13 is a diagram illustrating a data structure of the H.264/AVC. The data of the H.264/AVC includes SPS (Sequence Parameter Set) defined as a header containing information on codes of the whole sequence, PPS (Picture Parameter Set) defined as a header indicating an encoding mode of the whole picture, SEI (Supplemental Enhancement Information) added if necessary, an IDR picture (Instantaneous Decoding Refresh Picture), and so on. The 1-seg broadcasting involves performing the interframe prediction from within three pieces of reference pictures and generating a P picture (Predictive Picture). Further, one aggregated frame group delimited by the IDR picture is called GOP (Group Of Picture). In the embodiment, the GOP includes 15 frames per sec measured as the reproduction time in principle.

The personal computer according to the embodiment is a personal computer including a receiving tuner for the 1-seg broadcasting and a decoding unit, in which a picture based on decoded video signals is displayed on a display unit (display), and the audio elements based on the decoded audio signals are reproduced, thereby enabling the viewing and listening of the 1-seg broadcast to be done. It is considered that this type of personal computer fails in receiving the frames temporarily due to a state of radio waves generated by the device itself provided in the personal computer and a state of ambient radio waves and comes to have occurrence of a missing data.

Herein, in a conventional 1-seg broadcast viewing device, if the missing data occurs, such a problem arises that the picture or the sound with deficiency of information is output in a status quo, or alternatively the picture or the sound is not output (blackout).

Such being the case, the personal computer according to the embodiment outputs the data with a delay while buffering the data for 3 sec (i.e., the data for 3 sec is not deleted from a memory on the computer) and, if the missing data occurs in the moving picture data or the audio data, slow reproduction is conducted based on the buffered data, thus preventing a picture intermission and a sound intermission from occurring in the data-missing frames.

Namely, the personal computer according to the embodiment can, even if the missing data occurs in the moving picture data or the sound data, display the picture that gives almost no sense of discomfort to the viewer by neither outputting the picture with the deficient information nor causing the blackout of the picture nor having the voice intermission, and output the video signals and the audio signals to thereby reproduce the audio/video.

In the embodiment, the input data to be buffered is set to a quantity equivalent to 3 sec converted as the time in the case of reproducing the moving picture and the sound. For example, the 1-seg broadcasting uses the 15 frames per sec in the moving picture data, and hence the moving picture data of approximately 45 frames is buffered. It is preferable that this buffer quantity and the delay time are increased to the greatest possible degree, however, the embodiment adopts the 3-sec span by taking into consideration an allowable range of the delay when actually viewing and listening and a size of the buffer area that can be ensured on the personal computer. The buffer quantity and the delay time are, it is preferable, set to optimal values properly according to every embodiment. For instance, a thinkable scheme is that the buffer quantity is increased by augmenting an ensurable capacity of the main memory in a way that terminates resident and unnecessary applications or does not use a part of the main memory as a video memory (a single video memory is provided).

Further, the personal computer according to the embodiment outputs the data with the 3-sec delay by making use of this buffer. The execution of the delay output enables, even if the moving picture data or the audio data has the missing data, the picture or the sound of the missing frame to be interpolated without outputting the missing video signal or audio signal in the status quo by performing slow reproduction based on the buffed unoutput data.

<Functional Configuration of Personal Computer>

Figure 2:
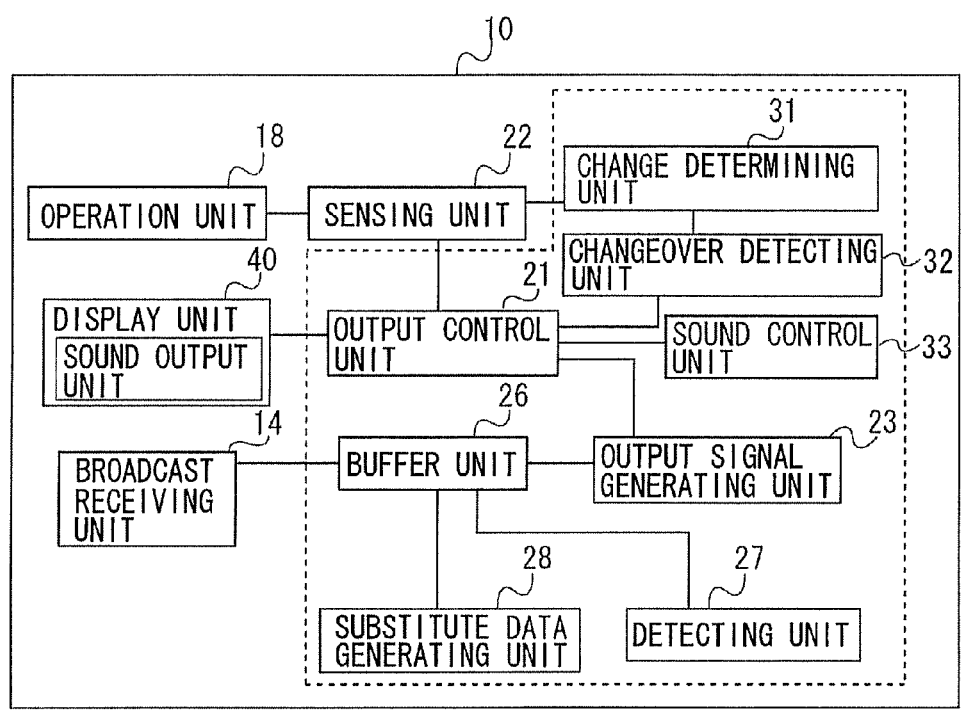
FIG. 2 is a diagram of a functional configuration of a personal computer according to the embodiment.

FIG. 2 is a diagram of a functional configuration of a personal computer 10 according to the embodiment. The personal computer 10 includes an operation unit 18 for operating the personal computer 10 upon receiving a user's operation, a detecting unit 22 which detects the operation on the operation unit 18, a broadcast receiving unit 14 which receives a TV broadcast, a signal output device 10A which outputs the video signal and the audio signal decoded based on the data output from the broadcast receiving unit 14 to a display unit (including a sound output unit) 40, and the display unit 40 which displays the broadcast program received by the broadcast receiving unit 14 based on the inputted video signal.

Moreover, the signal output device 10A includes a buffer unit 26 stored with a fixed quantity of data output by the broadcast receiving unit 14, an output signal generating unit 23 which generates the video signal and the audio signal by decoding the data output from the broadcast receiving unit 14, a detecting unit (missing data detecting unit) 27 which detects the missing data, a substitute data generating unit 28 which generates substitute data when the detecting unit 27 detects the missing data, an output control unit (corresponding to a reproducing unit) 21 which outputs the video signal and the audio signal to the display unit 40, a change determining unit 31 which determines a change of the reproduction speed of the input data, a changeover detecting unit 32 which detects the changeover timing, and a sound control unit 33 which mutes the sound output.

These respective function units can be realized by the computer including a CPU, a memory, etc and by programs executed on the computer.

Herein, the operation unit 18 is exemplified by an input device of the computer, a remote control unit built up by a combination of an infrared-ray receiving unit and an infrared-ray remote controller, a knob for operating a channel, an operation button, etc.

The detecting unit 22 detects the operation (e.g., changeover of the receiving channel) on the operation unit 18 via interfaces with the operation unit 18 and with the CPU, a device driver which processes the signals of the interfaces and OS (Operating System) that transfers and receives the signals to and from the operation unit 18 through the device driver. However, a dedicated piece of hardware may also be provided as the detecting unit 22. For example, the processes of the CPU may be shared by providing an input signal processing circuit for the operation unit. This type of known processing circuit is exemplified such as a keyboard controller and a mouse controller.

Further, for instance, a dedicated input control processor, which processes the signal from the operation unit 18, may be separately provided. The input control processor may convert the signal of the operation unit 18 into a predetermined signal and may transmit the signal to the output control unit 21.

The broadcast receiving unit 14 is a so-called 1-seg broadcasting tuner. The broadcast receiving unit 14 receives broadcasting waves by an antenna and outputs a data stream (e.g., TS (Transport Stream) signal) based on the received broadcasting waves.

The output signal generating unit 23 obtains the data output from the broadcast receiving unit 14 directly or via the buffer unit 26, and generates the video signal and the audio signal based on the obtained data. The output signal generating unit 23 may be configured as a computer program executed on the CPU. The output signal generating unit 23 may also, however, be configured as a dedicated processor which generates the video signal and the audio signal based on the input data and outputs the thus-generated video signal and audio signal.

The buffer unit 26 is temporarily stored with the inputted data. The buffer unit 26 accepts the input of the data output from the broadcast receiving unit 14 and buffers the input data for the 3-sec reproduction time. The buffer unit 26 may be configured as a power-backed-up volatile memory controller by the computer program executed on the CPU, a nonvolatile memory such as a flash memory, and a recording medium such as a hard disc or a portable medium. The buffer unit 26 may also, however, be configured as a dedicated memory buffered with the inputted data.

The output control unit 21 includes an interface with the display unit 40 and controls the video signal and the audio signal that are output to the display unit 40. The output control unit 21 outputs, based on the signal detected by the detecting unit 22, the video signal and the audio signal generated by the output signal generating unit 23 to the display unit 40. On this occasion, the output control unit 21 outputs the frames with the 3-sec delay from the time when the broadcast has been received. Further, the output control unit 21 controls the output based on the reproduction speed of which the change determining unit 31 notifies. To be specific, if less than the 1× speed, the output time of each frame is delayed, and, whereas if equal to or higher than the 1× speed, the reproduction speed of the dynamic image is changed in a way that thins out the frames. Along with this, the audio signals are also extended or thinned out, thus matching with the dynamic image. The output control unit 21 may be configured as the computer program executed on the CPU. The output control unit 21 may also be, however, configured as a dedicated processor which outputs the video signal and the audio signal.

The detecting unit 27 monitors integrity of the data (input data) inputted from the broadcast receiving unit 14, and detects the missing data. If the missing data is detected, the detecting unit 27 specifies a data block (which is the GOP in the case of the moving picture) with the occurrence of the missing data, and notifies the substitute data generating unit 28 and the change determining unit 31 of this data block. The substitute data generating unit 28, upon receiving this notification, starts a substitute data generating process.

The substitute data generating unit 28, when notified of the missing data from the detecting unit 27, acquires the data block for conversion and generates the substitute data for interpolating the picture or the sound of the missing frame by averaging this data block. An in-depth description of the process by the substitute data generating unit 28 will be made with reference to FIGS. 4 and 5. Further, the display unit 40 is a so-called monitor/speaker. The display unit 40, upon receiving inputs of the video signal and the audio signal output from the output control unit 21, displays the picture and reproduces the sound.

The change determining unit 31 determines, based on the user's operation or the notification from the detecting unit 27, a change of the reproduction speed of the input data containing the moving picture signal and the sound signal. For instance, if the user gives an instruction of the variable speed such as the fast-forwarding and the slow reproduction by operating the operation unit 18, the change determining unit 31 determines the reproduction speed in response to the instruction detected by the detecting unit 22, and notifies the output control unit 21 of the determined reproduction speed. Further, when the detecting unit 27 detects the missing data, the reproduction comes to have the reproduction speed less than the 1× speed by averaging the dynamic image with the substitute data, and hence the output control unit 21 is notified of the reproduction speed obtained corresponding to the number of missing frames. Further, if the detecting unit 27 can not detect the missing data any more, the change determining unit 31 determines the reproduction speed to be the 1× speed. Namely, the change determining unit 31 determines that the reproduction speed is returned (changed) to the 1× speed and notifies the output control unit 12 of this determination.

The changeover detecting unit 32, if the change determining unit 31 determines during the reproduction that the reproduction speed changes to a different speed, searches for the video signals and thus detects, as the changeover timing, a period having the degree of coincidence of the frames (dynamic images) which is equal to or larger than the predetermined value. The detection of the degree of coincidence involves, e.g., obtaining a correlation between a certain frame (Nth frame) and an (N+x)th frame posterior to a predetermined frame counted from the Nth frame by comparing the Nth frame and the (N+x)th frame in the video signals generated by the output signal generating unit 23 on a per-pixel basis and detecting, if the degree of coincidence becomes equal to or larger than the predetermined value (e.g., equal to or larger than 90%), the range (period) from the (N+1)th frame to the (N+x)th frame as the changeover timing. Moreover, another available scheme is to monitor the data quantity (difference quantity) of the P-pictures of IBP frames in the input data received by the broadcast receiving unit 14, to obtain the period for which the data quantity of a predetermined number (e.g., 5 pieces) of consecutive P pictures is equal to or smaller than a predetermined count or is the minimum within the GOP, and to set, as the changeover timing, the reproduction period from the (N+1)th frame to the (N+x)th frame based on the pictures in this period.

The sound control unit 33 mutes, based on the changeover timing detected by the changeover detecting unit 32, the sound output based on the sound signal. Specifically, the configuration may be a configuration of attenuating the audio signal output to the speaker of the display unit 40 from the output control unit 21, and may also be a configuration of muting the audio signal by notifying the output control unit 21 of the mute timing.

<Configuration of Personal Computer>

Figure 3:
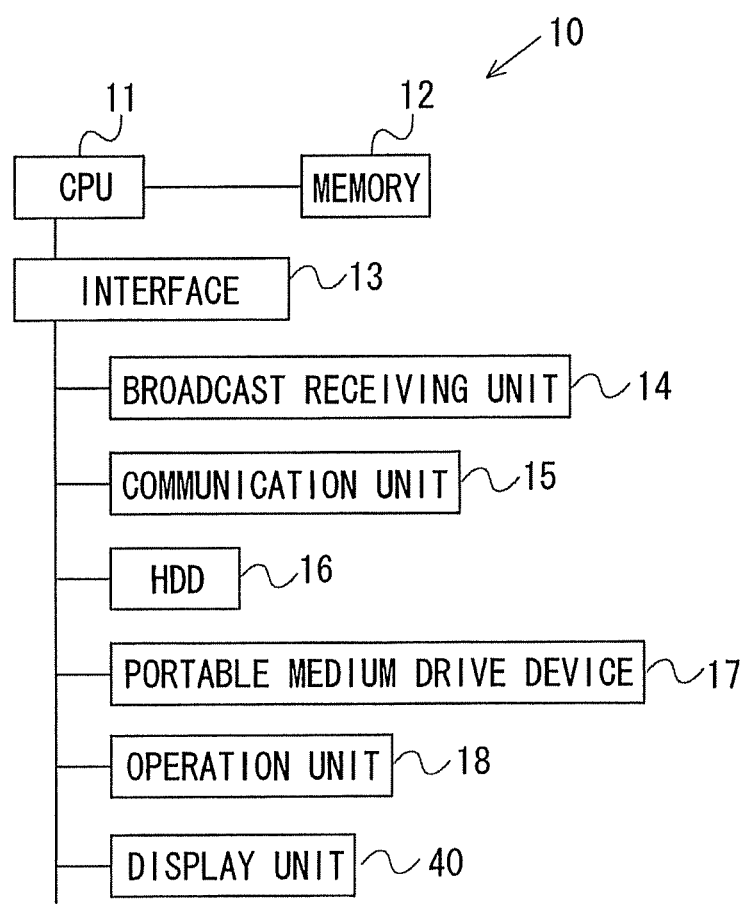
FIG. 3 is a diagram illustrating an example of a detailed configuration of the personal computer according to the embodiment.

FIG. 3 is a diagram illustrating an example of a detailed configuration of the personal computer 10 according to the embodiment. As illustrated in FIG. 3, the personal computer 10 includes a CPU 11 which controls the personal computer 10 by executing the computer program, a memory 12 stored with the computer program executed by the CPU 11 or the data processed by the CPU 11 and an interface 13 for connecting the CPU 11 to a variety of devices, and further includes the broadcast receiving unit 14, the communication unit 15, the hard disc drive 16, a portable medium drive 17, the operation unit 18 and the display unit 40, which are connected to the CPU 11 via the interface 13.

Herein, the CPU 11 controls the respective units of the personal computer 10 by executing the computer programs (sound signal control program etc), whereby the personal computer 10 functions as the device including the individual function units such as the detecting unit 22, the broadcast receiving unit 14, the output control unit 21, the output signal generating unit 23, the buffer unit 26, the detecting unit 27, the substitute data generating unit 28, the change determining unit 31, the changeover detecting unit 32 and the sound control unit 33. The memory 12 is stored with the programs executed by the CPU 11 and the data processed by the CPU 11. The memory 12 includes a volatile RAM (Random Access Memory) and a nonvolatile ROM (Read Only Memory). The ROM includes a rewritable semiconductor memory such as the flash memory, an EPROM (Erasable Programmable Read-Only Memory) and an EEPROM (Electrically Erasable Programmable Read-Only Memory).

The interface 13 may be any one of a serial interface such as a USE and a parallel interface such as a PCI (Peripheral Component Interconnect), an ISA (Industry Standard Architecture), an EISA (Extended ISA), an ATA (AT Attachment), an IDE (Integrated Drive Electronics), IEEE1394 and an SCSI (Small Computer System Interface).

Note that the interface is described as the interface 13 in FIG. 3, however, the connections between the CPU 11 and the respective devices may be established by a different interface. Further, a plurality of interfaces may also be bridge-connected.

The broadcast receiving unit 14 is the TV tuner for the 1-seg broadcasting. The broadcast receiving unit 14 includes a decoder (a demodulator of OFDM (Orthogonal Frequency Division Multiplexing) of the digital signals in addition to a high frequency unit containing a tuning circuit and an amplifier.

Herein, the high frequency unit converts high frequency electromagnetic waves into baseband signals. Furthermore, the OFDM demodulator includes an FFT (Fast Fourier Transform) processing circuit and an orthogonal demodulator, and generates the digital signal from the baseband signal. These processes may also be configured as a dedicated digital circuit which executes a sum-of-products operation. Moreover, these processes may also be configured by use of a processor such as a DSP (Digital Signal Processor) and a program. Further, an LSI for the demodulation, which is manufactured according to the TV Broadcasting Standards and is put on the market, may also be employed.

The communication unit 15 is an interface with a broadband network. The broadband network is exemplified by a cable network such as a LAN (Local Area Network), a cable TV network, an xDSL (x Digital Subscriber Line), an ADSL (Asymmetric Digital Subscriber Line) and an optical network, and by a wireless accessible network such as a wireless LAN and a fixed wireless access (FWA). The communication unit 15 acquires the computer program installed into the hard disc drive 16 from a server on the network and an electronic program guide (EPG) of the TV broadcasts. Generally, these broadband networks can be connected to the Internet.

The hard disc drive 16 is stored with the programs loaded into the memory 12. Further, the hard disc drive 16 is stored with the data processed by the CPU 11.

Note that a plurality of hard disc drives 16 may be provided without being limited to the single drive. Moreover, the hard disc drive 16 may be a drive managed by another computer, e.g., a disc server on the network. In this case, the CPU 11 may perform the communications with the disc server via the communication unit 15. Then, the CPU 11 may display the EPG etc acquired from the disc server on the display unit 40.

The portable medium drive 17 is exemplified by a drive for a CD (Compact Disc), a DVD (Digital Versatile Disk), an HD-DVD and a Blu-ray disc. Moreover, the portable medium drive 17 may also be an input/output device of a card medium having the nonvolatile memory such as the flash memory. A medium driven by the portable medium drive 17 retains, e.g., the computer program installed into the hard disc drive 16, the input data and so on.

The operation unit 18 is an input device. The input device is exemplified by a keyboard, a pointing device, etc. Further, the operation unit 18 includes a remote control operation unit constructed of a combination of an infrared-ray receiving unit and an infrared-ray remote controller, a variety of switches, a knob for operating the channel, etc. The type of the pointing device is not particularly limited, and a proper device among a mouse, a trackball, a dial type operation unit, a device for moving a stick-type pointer on the display unit 40, a device for detecting an operation of a user's finger based on an electrostatic capacity, a touch panel and a joystick may be used corresponding to characteristics of the personal computer 10 and needs of the user.

The keyboard transmits an electric signal associated with a key inputted corresponding to the input operation of the user to an unillustrated keyboard controller. The keyboard controller transmits a code corresponding to this electric signal to the CPU 11.

The pointing device detects the user's operation and transmits an operation signal thereof to an unillustrated pointing device controller (e.g., an unillustrated mouse controller or the interface 13 etc). The pointing device controller receiving the operation signal transmits information for generating an operating direction and an operation quantity to the CPU 11. The device driver of the CPU 11 displays and moves, based on the operation signal transmitted from the pointing device controller, the pointer on the screen of the display unit 40.

Further, the OS of the CPU 11 determines a positional relationship between the pointer and an object (a window, a button, a menu, a list, etc) on the screen. Then, the OS sets the object, located in the position where the pointer exists, in a selective status or a focus status. Moreover, the OS decides to select the object by performing a selection deciding operation with respect to the pointing device, for example, by pressing the mouse button.

The display unit 40 is exemplified by a liquid crystal display device, a plasma display panel, a CRT (Cathode Ray Tube), an electroluminescence panel, etc. Incidentally, though not illustrated, the display unit 40 includes a RAM stored with image data and a drive circuit which drives the display unit 40 based on the data in the RAM. The RAM stored with the image data and the drive circuit driving the display unit 40 may, however, be provided as an image processing board, independently. In this case, pieces of data organizing screen information given from the CPU 11 are inputted to the image processing board.

Further, the display unit 40 is attached with the speaker (the sound output unit) from which to output the audio element based on the audio signal output from the output control unit 21 and the sound read from the hard disc drive 16 or the portable medium drive 17 and reproduced by an unillustrated voice sound synthesizing board. The voice synthesizing board converts the digital data of, e.g., MP3 (MPEG Audio Player-3) into the sound.

The information device according to the embodiment can be configured as the personal computer 10 described above. The information device according to the embodiment is not, however, limited to the personal computer but may be another device, e.g., a TV receiving device having the same function. Furthermore, the information device can be also realized by a tuner for receiving the TV broadcast, a set-top box, a mobile phone with a TV broadcast receiving function, a mobile information terminal (PDA (Personal Digital Assistant), a game machine, an on-vehicle device with the TV broadcast receiving function, etc.

Figure 4:
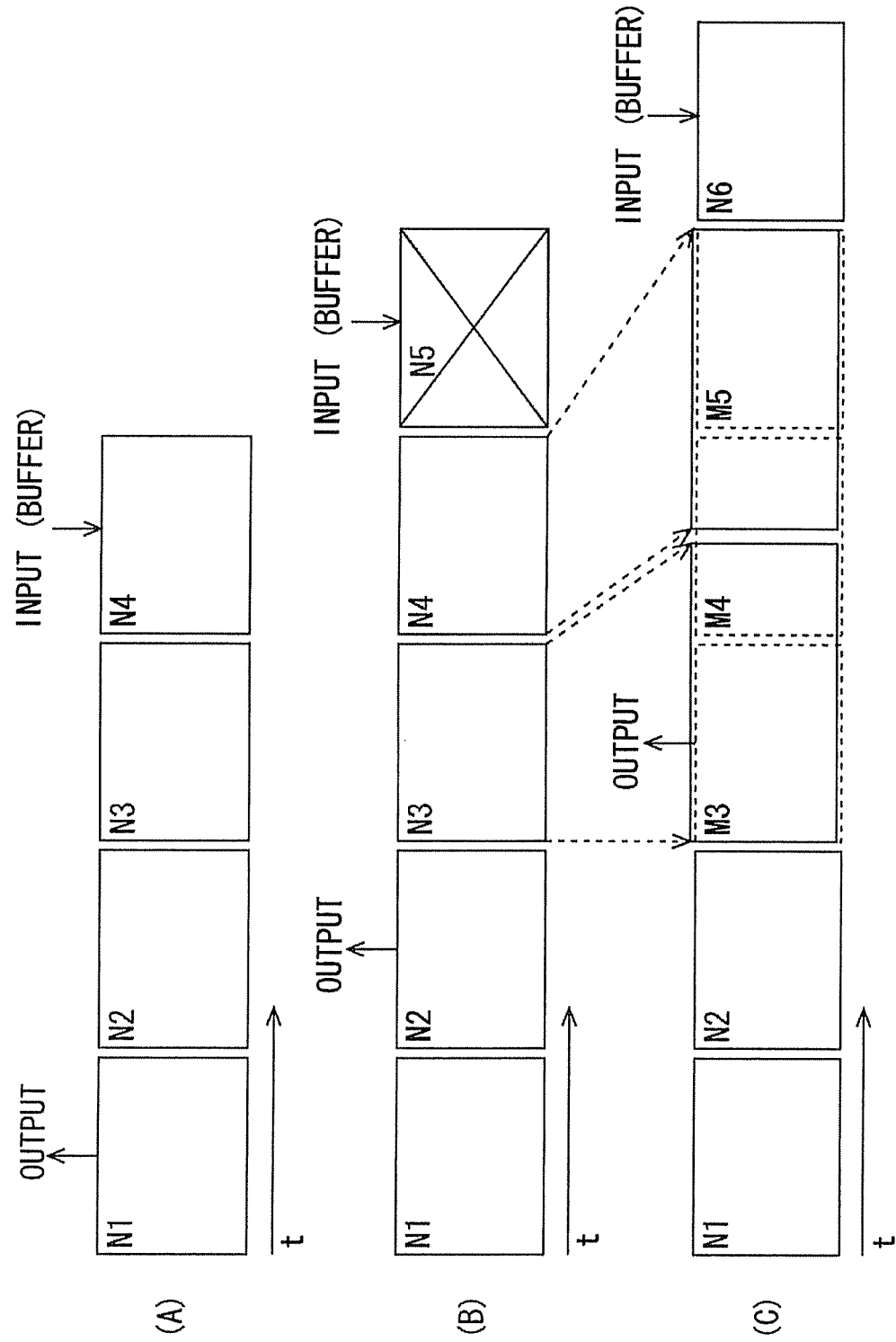
FIG. 4 is a diagram illustrating a substitute data generating process in the embodiment.

FIG. 4 is a diagram illustrating a substitute data generating process (1) in the embodiment. The substitute data generating process is executed by the substitute data generating unit 28. A status (A) in FIG. 4 depicts a status where the normal input data is received and then output. A rectangle in FIG. 4 represents a data block for 1 sec, in which the data blocks are inputted in the sequence of N1, N2, N3, .... The personal computer 10 according to the embodiment buffers the 3-sec data, and hence, when the data block N4 is inputted, the data block N1 inputted 3 sec before is output.

A status (B) in FIG. 4 represents a status after 1 sec from the status (A) in FIG. 4. Herein, if the data of N5 inputted is not normal and if the processing continues in the status quo, it follows that abnormal data is output after 3 sec. Such being the case, a scheme of the embodiment is to average the data blocks N3 and N4 posterior to the abnormal data block N5 but anterior to N2 defined as an output point at the present into substitute data blocks M3-M5 as substitutes for N3-N5.

A status (C) in FIG. 4 represents a status after 1 sec from the status (B) in FIG. 4. Herein, the output signals (the video signal and the audio signal) generated based on M3 in place of N3 are output. The moving picture and the sound, which have been output and reproduced, are slowly reproduced at a speed that is $2/3$ as slow as the speed in the case where the substitute data generating process (1) is not executed. Hereafter, the data blocks M4 and M5 are consecutively output. The moving picture and the sound, which have been output and reproduced, are also slowly reproduced at the speed that is $2/3$ as slow as the normal speed.

The substitute data generating process (1) described above enables the reproduction time for the missing data blocks to be interpolated. When returning to the normal reproducing process as it is and when trying to perform the output based on the inputted data, however, a motion corresponding to the missing data block (N5 in FIG. 4) is skipped, and further, because of the slow reproduction at the speed that is $2/3$ as slow as the normal speed being instantaneously returned to the normal equi-speed reproduction, there is an increased sense of discomfort given to the viewer who views the displayed moving picture and listens to the sound. Therefore, a scheme of the embodiment is to execute a substitute data generating process (2) that will hereinafter be described subsequently to the substitute data generating process (1).

Figure 6:
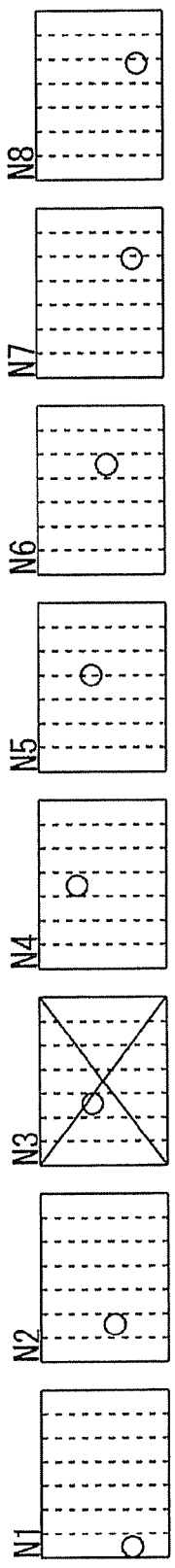
FIG. 6 is a diagram illustrating an example of a picture displayed in the case of executing the substitute data generating process illustrated in FIG. 5.

FIG. 5 is a diagram illustrating the substitute data generating process in the embodiment. Further, FIG. 6 is a diagram illustrating an example of the picture displayed in the case of executing the substitute data generating process depicted in FIG. 5. An assumption in the process illustrated in FIG. 5 is that N3 is missed, and N1, N2 are averaged into M1-M3 in the substitute data generating process (1). Herein, though the normal data block N4 is inputted, the sense of discomfort given to the viewer rises for the reason elucidated above, and hence the data block N4 is not output in the status quo. The substitute data generating unit 28 averages the data of the substitute data blocks M2, M3 and the data of the data block N4, which are averaged in the substitute data generating process (1), into the substitute data block M4. It may be noted that on the occasion of the averaging process, the picture or the sound related to the missing data block N3 is generated in a prediction process as a concomitant of the averaging process. For example, in the averaging process of the moving picture data, the missing motion (frame) is complemented in a prediction process similar to the interframe prediction described above.

At this time, an information quantity of the substitute data blocks M2, M3 are $2/3$ as small as that of the normal data blocks, and therefore the information quantity of M4 is a $7/9$-fold quantity given such as $(2/3+2/3+1)/3=7/9$. Namely, the output based on M4 comes to the slow reproduction at the speed that is $7/9$ as slow as the speed in the case of not executing the substitute data generating process. This speed is slightly faster than an apparent speed in the case of reproducing the output signals based on M1 through M3, which is $2/3$ as slow as the normal speed. Hereafter, the averaging process into the substitute data blocks M5, M6 is conducted by the same method. On this occasion, as far as the missing input data does not occur again, the new input data used for averaging process has the information quantity equal to the normal information quantity, so that the substitute data block has the information quantity that gradually gets close to the normal information quantity, i.e., the normal speed (see FIG. 6). In the case of the embodiment, the substitute data block M5 has the information quantity (speed) that is $23/27$ as small as the normal quantity, and the substitute data block M6 has the information quantity (speed) that is $73/81$ as small as the normal quantity (refer to a calculation formula in FIG. 5).

Note that in the calculation formula illustrated in FIG. 5, the re-calculated substitute data block is marked with [' (dash)]. For instance, M3' used for generating the substitute data block M5 is a data block generated in the averaging process accompanying the generation of the substitute data block M4. Therefore, the information quantity of M3' is $7/9$ as small as the normal quantity unlike the case in which the information quantity of the substitute data block M3 is $2/3$ as small as the normal quantity.

Even when conducting the averaging process into the substitute data block while adding the new input data in the substitute data generating process (2), since the substitute data block generating method intends to average the data, it does not happen that the information quantity of the substitute data block to be generated becomes equal to the normal quantity. Namely, such a status continues that the apparent reproduction speed does not follow up the normal reproduction speed. This being the case, a scheme of the embodiment is that if the reproduction speed becomes equal to or higher than the predetermined speed (e.g., $73/81$), the degree of coincidence of the frames forming the moving picture is monitored, then a period containing a predetermined number of frames (e.g., 5 frames) of which the degree of coincidence is equal to or larger than the predetermined value (e.g., 90%) is detected as the changeover timing, and the reproduction speed is changed to the 1× speed at this changeover timing. This process is termed a substitute data generating process (3). For example, according to the example in FIG. 5, the reproduction speed reaches the $73/83 \times$ speed at the substitute data block M6, so that the frame of the data block N7 is searched, a certain frame (Nth frame) and the frame after the (N+x)th frame are compared with each other, the frames ranging from the frame having 90% defined as the degree of coincidence to the (N+x)th frame posterior to the predetermined frame are compared on a pixel-by-pixel basis to thereby obtain a correlation, and, if the degree of coincidence is equal to or larger than the predetermined value (equal to or larger than, e.g., 90%), the range from the (N+1)th frame to the (N+x)th frame is detected as the changeover timing.

When the changeover timing is detected, as described above, the sound output is muted and the reproduction speed is changed over. Hereafter, the substitute data generating process is not carried out till the missing data is detected next time, and the output signal based on the input data is output.

<Processing Flow>

Figure 7:
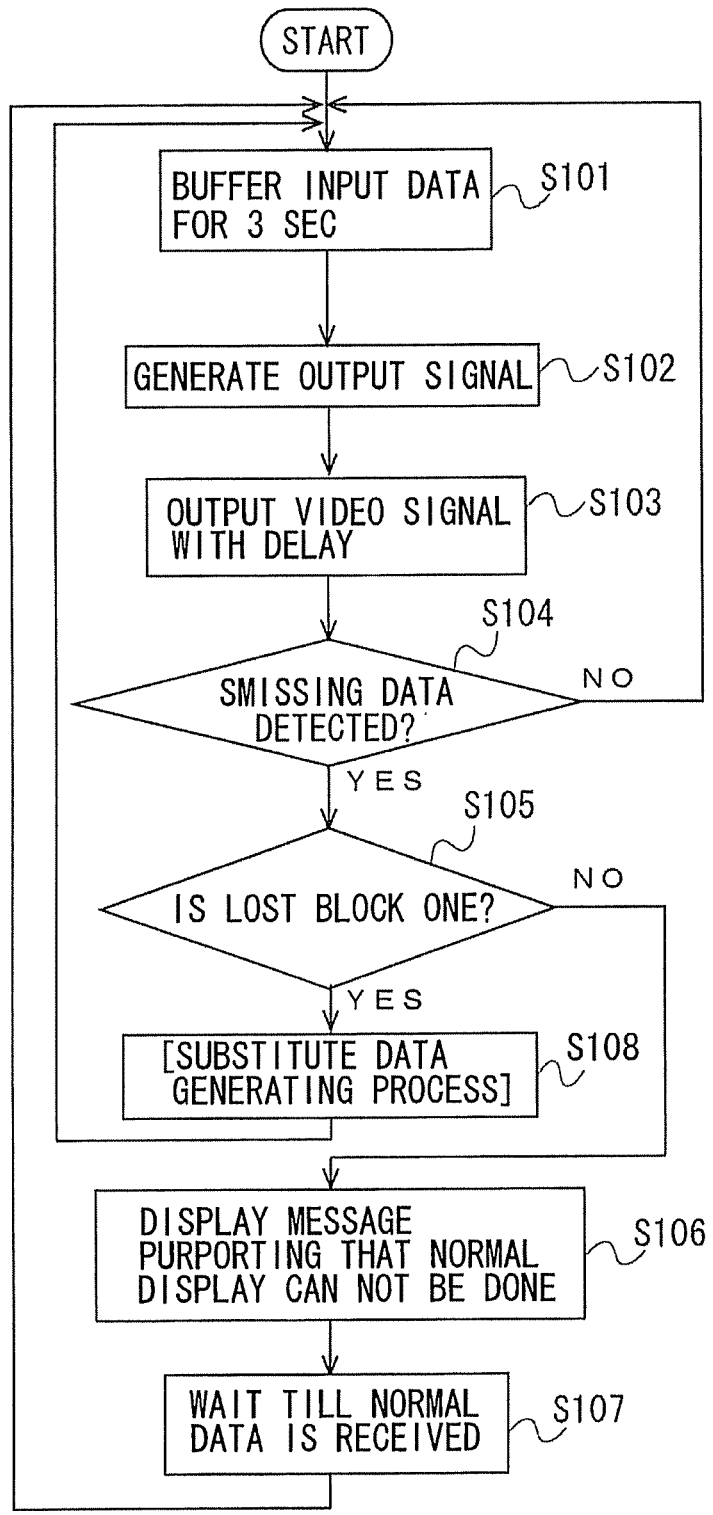
FIG. 7 is a flowchart illustrating a flow of the whole signal output process in the embodiment.
Figure 8:
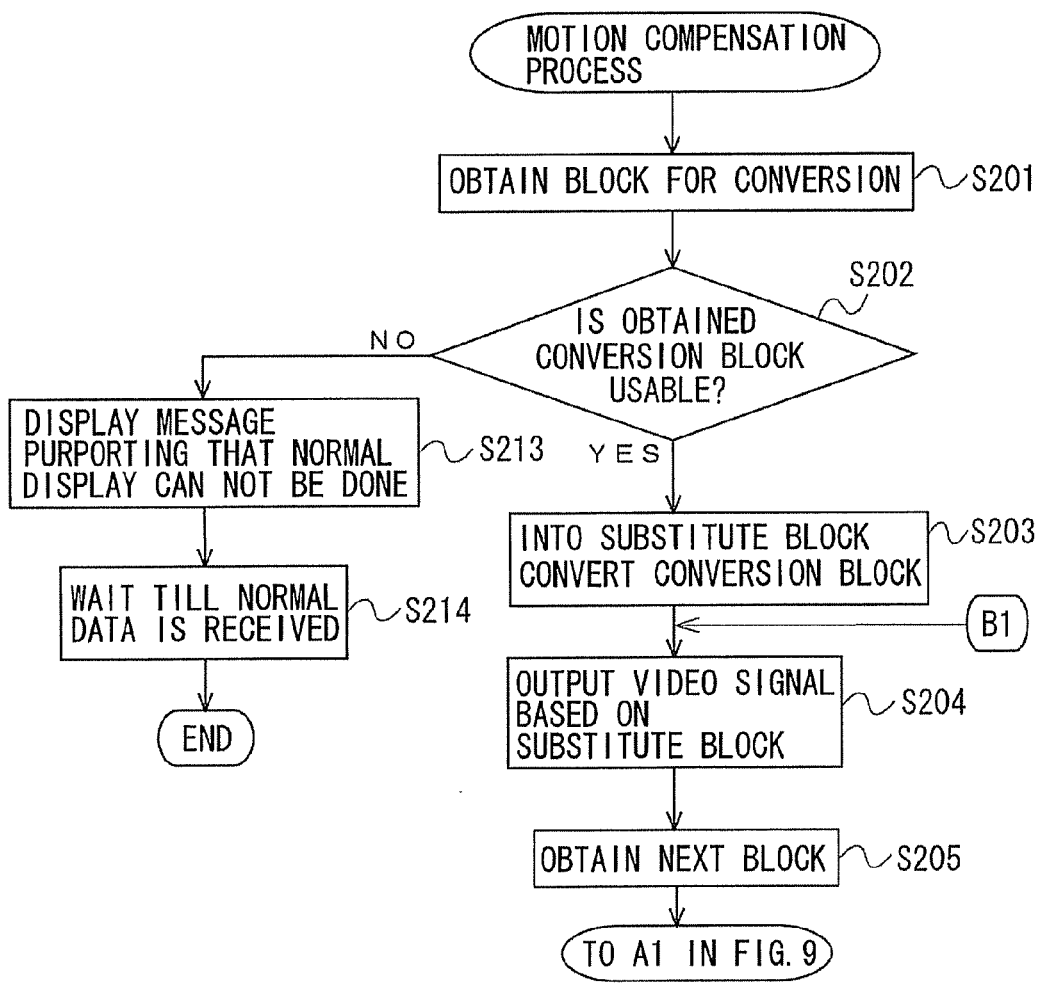
FIG. 8 is a flowchart illustrating a flow of the substitute data generating process in the embodiment.
Figure 9:
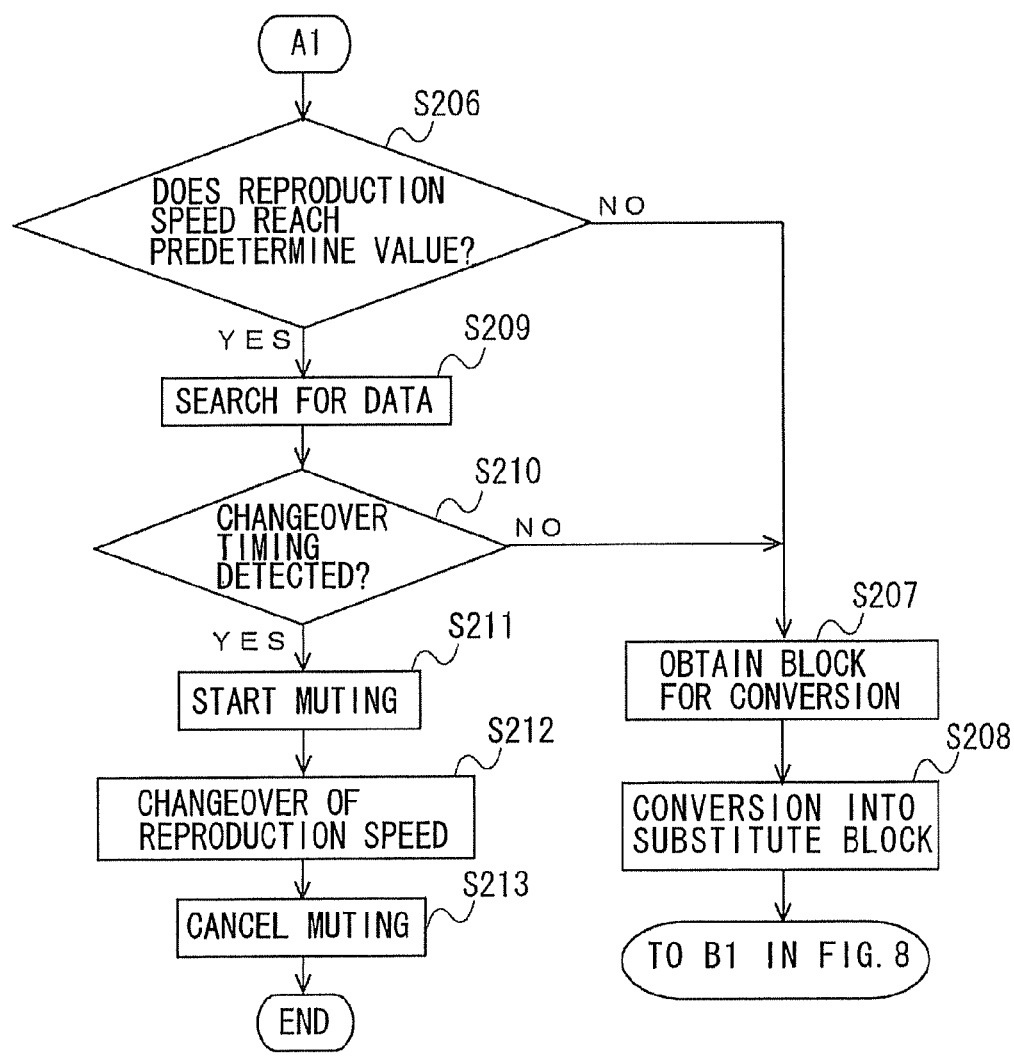
FIG. 9 is a flowchart illustrating a flow of the substitute data generating process and a flow of a reproduction speed change over process in the embodiment.

FIGS. 7 through 9 each illustrate a processing flow of the personal computer 10. FIG. 7 is a flowchart illustrating a flow of the whole signal output process in the embodiment. Execution of the signal output process illustrated in this flowchart is triggered by an event that the detecting unit 22 receives a TV viewing start operation on the operation unit 18 and issues an instruction of starting the signal output process to the output control unit 21.

In step S101, the 3-sec data output from the broadcast receiving unit 14 is buffered. The buffer unit 26 buffers the data output from the broadcast receiving unit 14 for 3 sec as the reproduction time. Thereafter, the processing advances to step S102.

In step S102, the output signal is generated. The output signal generating unit 23 acquires the input data from the buffer unit 26 and generates, based on the acquired input data, the video signal and the audio signal. Herein, the video signal is defined as information containing the picture of each of the frames necessary for displaying the moving picture. Thereafter, the processing advances to step S103.

In step S103, the video signal is output with a delay. The output control unit 21 outputs, in the status of the 3-sec input data being buffered, the video signal and the audio signal generated by the output signal generating unit 23 to the display unit 40 with the 3-sec delay from the time when receiving the broadcast. Namely, the output control unit 21 conducts the output with the 3-sec delay by use of the buffer unit 26. Thereafter, the processing advances to step S104.

In step S104, the missing data is monitored. The detecting unit 27 monitors whether or not the input data buffered by the buffer unit 26 contains the data block with the deficiency of information, i.e., monitors whether the missing data exists or not. If none of the missing data is detected, the processes illustrated in step S101 through step S104 are repeated. Whereas if the missing data is detected, the processing advances to step S105.

In step S105, it is determined whether the data block having the missing data is one block (i.e., for 1 sec) or not. The detecting unit 27 specifies the data block containing the missing frame detected in step S104, and notifies the substitute data generating unit 28 and the change determining unit 31 of the specified data block. Further, the change determining unit 31 notified of the missing frame determines whether the data block containing the missing frame is one block or not. Herein, when determining that the missing data block is one block, the change of the reproduction speed to the slow-reproduction ($2/3$-fold speed in this example) is determined, and the processing proceeds to step S108. While on the other hand, if the missing data block is determined not to be one block (determined to be two or more blocks), the output control unit 21 is notified of this purport, and the processing proceeds to step S106.

In step S106, a message is displayed, which indicates a purport that the normal display can not be done. The output control unit 21 detects that the substitute data generating unit 28 can not generate the substitute data and outputs, to the display unit 40, the video signal containing a message purporting that the normal display can not be done. Upon receiving this message, the display unit 40 displays the message purporting that the normal display can not be done, from which the view can grasp a state of being disabled from viewing due to some factor. Thereafter, the processing advances to step S107.

Executed in step S107 is a standby process till the normal data is received. When the broadcast receiving unit 14 receives the normal data, the processing proceeds to step S101, in which the video output and the video display resume.

In step S108, the substitute data generating process is executed. The substitute data generating unit 28 acquires, as a data block for conversion, the data block posterior to the missing data block from the input data buffered by the buffer unit 26 but anterior to the data block related to the output of the output control unit at that point of time, and averages this data block for the conversion into the substitute data block for the reproduction time (3 sec in the embodiment) obtained by adding the reproduction time (1 sec in the embodiment) of the missing data block to the reproduction time (2 sec in the embodiment) related to the data block for the conversion, thus generating the substitute data. An in-depth description of the substitute data generating process will be made with reference to FIG. 8. Thereafter, the processing advances to step S101.

FIGS. 8 and 9 are flowcharts each illustrating a flow of the substitute data generating process in the embodiment. The substitute data generating process given in the flowchart corresponds to step S108 depicted in FIG. 7.

In step S201, the data block for the conversion is acquired. The substitute data generating unit 28 acquires, as the data blocks for the conversion, the data blocks (i.e., the data blocks for 2 sec) one and two before the missing data block from the input data buffered by the buffer unit 26. To give an explanation by taking FIG. 4 for example, the data block N5 is missed, in which case N3 and N4 are acquired as the data blocks for the conversion. Thereafter, the processing advances to step S202.

In step S202, it is determined whether the acquired data blocks for the conversion are usable or not. The substitute data generating unit 28 determines whether or not the data blocks for the conversion acquired in step S201 are usable normal data blocks for generating the substitute data. If the acquired data blocks for the conversion contain the missing frame of the data and are therefore determined to be unusable as the data blocks for the conversion, the processing proceeds to step S213. Whereas if the acquired data blocks for the conversion are determined to be usable as the data blocks for the conversion, the processing proceeds to step S203.

In step S203, the data blocks for 2 sec, which are acquired as the data blocks for the conversion, are averaged into the substitute data blocks for 3 sec. The substitute data generating unit 28 averages the data blocks for 2 sec, which are acquired as the data blocks for the conversion, into the substitute data blocks for the reproduction time (3 sec in the embodiment) obtained by adding the reproduction time (1 sec in the embodiment) of the data block of the missing frame to the reproduction time (2 sec in the embodiment) related to the data block for the conversion. According to the example in FIG. 4, totally the data blocks N3 and N4 for 2 sec (corresponding to the two blocks) are averaged into the substitute data blocks M3, M4, M5 for 3 sec. Thereafter, the processing advances to step S204.

In step S204, the video signals based on the substitute data blocks are output. The substitute data generating unit 28 generates the output signals based on the substitute data blocks M3, M4, M5 obtained in step S203. The output control unit 21 sequentially outputs the generated output signals as the video signals and the audio signals to the display unit 40. Thereafter, the processing advances to step S205.

In step S205, the next data block is acquired. The substitute data generating unit 28 acquires the data block as a next output target block from the buffer unit 26. Thereafter, the processing advances to step S206.

In step S206, the change determining unit 31 determines whether the reproduction speed reaches a predetermined value (e.g., a $73/81$-fold speed) or not. Herein, the predetermined value is set to a value of such an extent that any sense of discomfort does not arise from within the viewer even when terminating the slow-reproduction. In the case of the reproduction speed equal to or larger than the predetermined value, the change determining unit 31 determines that the reproduction speed changes to the 1× speed, and the processing proceeds to step S209. While on the other hand, if the reproduction speed is less than the predetermined value, the change determining unit 31 increases, advancing to the step S207, the speed by executing the substitute data generating process (2), i.e., determines that the reproduction speed approximates the 1× speed.

In step S207, the next data block for the conversion is acquired. The substitute data generating unit 28 acquires the two anterior substitute data blocks (i.e., closer to the output target data block) in the three substitute data blocks obtained in the substitute data generating process of the last time. According to the example in FIG. 5, for obtaining the substitute data block M4 that is output as the substitute for the data block N4 obtained in step S205, the substitute data generating unit 28 acquires the substitute data blocks M2 and M3 obtained in the substitute data generating process of the last time. Thereafter, the processing advances to step S208.

In step S208, the data block for the conversion and the output target data block are averaged into the substitute data blocks for 3 sec. The substitute data generating unit 28 acquires the substitute data block that is output as the substitute for the next output target data block by averaging the data blocks obtained in step S205 and step S207. According to the example in FIG. 5, for obtaining the substitute data block M4 that is output as the substitute for the data block N4, the substitute data generating unit 28 acquires the data block N4 and the substitute data blocks M2 and M3 obtained in the substitute data generating process of the last time, and averages these three data blocks, thereby obtaining the substitute data block M4 which does not give any sense of discomfort to the viewer in the case of being output consecutively from the substitute data block M3 that has been output just before it. Thereafter, the processing advances to step S204.

Then, the substitute data generating process (2) is repeated, and, when determining in step S206 that the reproduction speed is equal to or larger than the predetermined value, in step S209, the changeover detecting unit 32 detects the period in which the degree of coincidence of each of the frames (dynamic images) of the data block is equal to or larger than the predetermined value by searching for the data block (e.g., N7) acquired in step S205 (S210). When the similar frames are thus consecutive, it can be analogized that the voice continues in the similar status with less of change, and hence this point is set as the changeover timing of the speed. Note that if the changeover timing can not be detected, the processing proceeds to step S207, in which the substitute data generating process (2) is executed, and the changeover timing is again detected by searching for the next data block (S209).

Then, within this detected period, i.e., when reproducing the frame of which the degree of coincidence is equal to or larger than the predetermined value, the mute is started (S211), then the reproduction speed is changed over to the 1× speed (S212), and the mute is canceled (S213). Namely, herein, the substitute data generating process is terminated, and hereafter the normal output process is executed till the missing data again occurs. Thereafter, the processes given in the flowchart are finished, and the processing advances to step S101 in FIG. 7.

<Modified Example>

It should be noted that in the embodiment, the input data has the data block on the per 1-sec basis, the 3-sec data blocks are buffered, and the substitute data is generated on the per 3-block basis, however, with respect to these values, it is preferable that the optimal values are properly selected according to the embodiments. For example, if the input data has the data block on a per 0.5-sec basis, the buffer time is set to 2 sec, and the substitute data is generated on a per 4-block basis, in which case an initial information quantity of the substitute data block generated in response to the missing data becomes ¾ as small as the normal quantity, with the result that it is feasible to make the interpolation that is hard to give the sense of discomfort to the viewer.

FIGS. 7 through 9 illustrate the example in which the internal components of the personal computer 10 depicted in FIG. 2, which are, i.e., the detecting unit 22, the broadcast receiving unit 14, the output control unit 21, the output signal generating unit 23, the buffer unit 26, the detecting unit 27, the substitute data generating unit 28 and the output control unit 21, are realized by the programs executed by the CPU 11. In place of this configuration, however, as discussed in the <Configuration of Personal Computer>, any one or more of the internal components of the personal computer 10 may be realized by processors, hardware circuits, etc that are different from the CPU 11. Namely, the respective components in FIG. 2 may be configured by the different processors or digital circuits. Even in the case of including the processors or the digital circuits other than CPU 11, the processing procedures thereof are the same as those illustrated in FIGS. 7 and 8. Namely, the personal computer 10 in the embodiment can be realized as the programs of the CPU 11 or by the dedicated processors and further by the dedicated digital circuits.

<Example of Changeover of Reproduction Speed by User's Operation>

In the example described above, the sound output is muted in the case of automatically detecting the changeover of the reproduction speed by detecting the missing data, however, the sound output is also muted in the case of changing over the reproduction speed in response to the user's operation.

Figure 10:
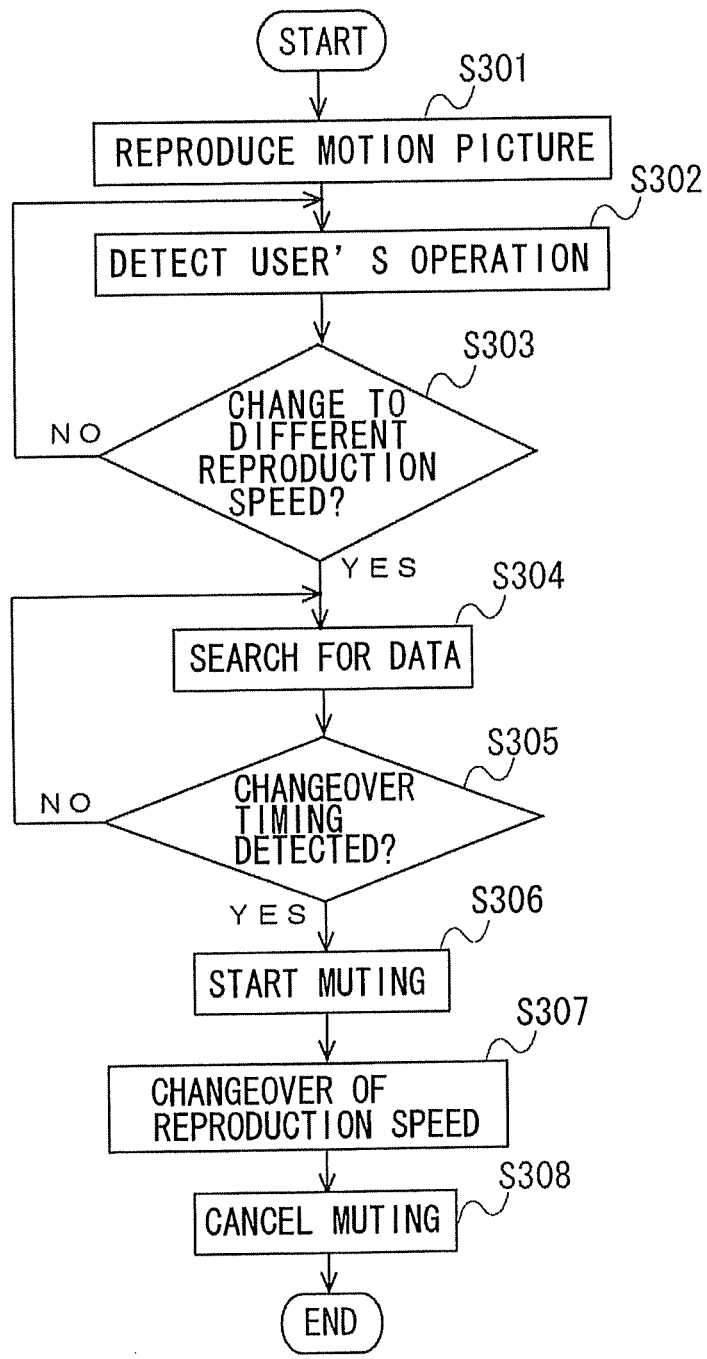
FIG. 10 is an explanatory diagram of a reproduction speed changeover process corresponding to a user's operation.

FIG. 10 is an explanatory diagram of a changeover method corresponding to the user's operation. To begin with, the device is started up, and the moving picture is reproduced based on the input data (S301).

Next, the detecting unit 22 detects the user's operation, e.g., detects that any one of a reproduction (1× speed) button, a fast-forwarding button and a slow-reproduction button is pressed, and notifies the change determining unit 31 of this user's operation (S302).

The change determining unit 31, if the notified operation is the reproduction at a speed different from the present reproduction speed, determines the change of the reproduction speed, and notifies the changeover detecting unit 32 and the output control unit 22 of this change (S303). For instance, the change determining unit 31 notifies of the changeover to the 1× speed from the variable speed, the changeover to the variable speed from the 1× speed and the changeover from the variable speed to a different variable speed.

With a trigger of this notification, the changeover detecting unit 32 searches for the input data (S304), detects, as the changeover timing, the period in which the degree of coincidence of each of the frames (dynamic images) forming the moving picture is equal to or larger than the predetermined value, and notifies the output control unit 22 of this changeover timing (S305). Note that if unable to detect this timing, the processing loops back to step S304, where the next data block is searched.

Then, on the occasion of starting the reproduction of these frames, the sound control unit 33 starts muting the sound output (fade-out) (S306), and, after starting the mute, the output control unit 22 changes the reproduction speed according to the notification given from the change determining unit 31 (S307).

At this timing, the output control unit 22 sets, e.g., the 1× speed through a change to outputting all the frames without thinning out the frames from the state of conducting the reproduction at the 2× speed by thinning out the moving picture signals at an interval of one frame, or sets the 3× speed through a change to outputting the frames at an interval of 2 frames. Further, the output control unit 22 sets the 1× speed through a change to outputting each frame on a per once basis from the state of making the reproduction at the ½× speed by outputting the same frame on a per twice basis, or sets the ⅓× speed through a change to outputting each frame on a per three-times basis.

After changing over the reproduction speed, the reproduction sound control unit 33 finishes muting the sound output (fade-in) (S308).

Thus, according to this modified example, on the occasion of changing the reproduction speed, within the period in which the frames having the high degree of coincidence are consecutive, the mute is started, the reproduction speed is changed over and the mute is canceled, thereby enabling the changeover to be done at the proper timing without causing noises.

Namely, the changeover is performed in the process of muting the sound, and therefore the noises do not occur. Then, the scheme is not that mute period is waited as hitherto done but that the mute is conducted by detecting the continuation of the frames having the high degree of coincidence, i.e., the changeover can be performed at the proper timing because of generating the mute period. Moreover, the changeover can be done without any sense of discomfort because of performing the changeover by detecting the continuation of the frames having the high degree of coincidence. Still further, in the case of the continuation of the frames having the high degree of coincidence, the similar state continues with respect to the voice with less of fluctuation, so that even when starting and canceling the mute in a short period, there is the slight sense of discomfort, and this fluctuation is not recognized as the noise.

<Others>

The embodiment is not limited to the illustrative examples described above and can be, as a matter of course, modified in a variety of forms within the scope that does not deviate from the gist of the embodiment. Further, the components described above can be combined to the greatest possible degree.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed:

1. A sound signal control device comprising:
   a change determining unit to determine a change of a reproduction speed of input data containing a moving picture signal and a sound signal;
   a changeover detecting unit to detect, as a changeover timing, a predetermined period in which a degree of coincidence of a moving picture is equal to or larger than a predetermined value when the change determining unit determines the change to a different reproduction speed during the reproduction;
   a reproducing unit to reproduce a sound and the moving picture based on the input data and, when the change determining unit determines the change of the reproduction speed, changing over the reproduction speed at the changeover timing; and
   a sound control unit to mute a sound output based on the sound signal at the changeover timing,
   wherein the reproducing unit changes over the reproduction speed when the sound control unit mutes the sound output, and the sound control unit cancels the mute within the predetermined period when the reproducing unit changes over the reproduction speed.

2. The sound signal control device according to claim 1, wherein the detecting unit detects, if the degree of coincidence is equal to or larger than the predetermined value by making a comparison between the frames ranging from an Nth frame to an (N+x)th frame posterior to a predetermined frame counted from the Nth frame in the moving picture signal, a range from an (N+1)th frame to the (N+x)th frame as the changeover timing.

3. The sound signal control device according to claim 1, wherein when the change determining unit determines a change to a 1× speed from the reproduction speed less than the 1× speed or a change to the 1× speed from the reproduction speed exceeding the 1× speed, the sound control unit mutes the sound output.

4. The sound signal control device according to claim 1, further comprising:
a missing data detecting unit to detect missing data of the input data; and
a substitute data generating unit to generate substitute data, when the missing data detecting unit detects the missing data of the input data, by averaging units of the input which exclude data containing the missing data being detected,
wherein the substitute data is output for a reproduction time duration obtained by adding the reproduction time duration of the input data used for the averaging to the reproduction time duration of the data with the missing data being detected,
when the detecting unit detects the missing data of the input data, the change determining unit determines a change to the reproduction speed less than the 1× speed, according to a proportion of the number of data used for averaging and the number of substitute data, and
when the detecting unit comes to detect none of the missing data of the input data, the change determining unit determines a change to the 1× reproduction speed.

5. A sound signal control method by which a reproducing device of a sound and a moving picture executes:
determining a change of a reproduction speed of input data containing a moving picture signal and a sound signal;
detecting, as a changeover timing, a period in which a degree of coincidence of the moving picture is equal to or larger than a predetermined value when determining the change to a different reproduction speed during the reproduction;
reproducing the sound and the moving picture based on the input data and, when determining the change of the reproduction speed, changing over the reproduction speed at the changeover timing;
muting a sound output based on the sound signal at the changeover timing,
changing over the reproduction speed when the sound output is muted, and
canceling the mute within the predetermined period when the reproduction speed is changed over.

6. The sound signal control method according to claim 5, wherein if the degree of coincidence is equal to or larger than the predetermined value by making a comparison between the frames ranging from an Nth frame to an (N+x)th frame posterior to a predetermined frame counted from the Nth frame in the moving picture signal, a range from an (N+1)th frame to the (N+x)th frame is detected as the changeover timing.

7. The sound signal control method according to claim 5, wherein if the reproduction speed is changed to a 1× speed from the reproduction speed less than the 1× speed or to the 1× speed from the reproduction speed exceeding the 1× speed, the sound output is muted.

8. The sound signal control method according to claim 5, further comprising:
detecting missing data of the input data; and
generating substitute data, when the missing data of the input data is detected, by averaging the input data which exclude data containing the missing data being detected,
wherein the substitute data is output for a reproduction time duration obtained by adding the reproduction time duration of the input data used for the averaging to the reproduction time
duration of the data with the missing data being detected,
when the missing data of the input data is detected, determining a change to the reproduction speed less than the 1× speed, according to a proportion of the number of data used for averaging and the number of substitute data, and
when coming to detect none of the missing data of the input data, a change to the 1× reproduction speed is determined.

9. A non-transitory recording medium recorded with a sound signal control program for making a reproducing device of a sound and a moving picture execute:
determining a change of a reproduction speed of input data containing a moving picture signal and a sound signal;
detecting, as a changeover timing, a period in which a degree of coincidence of the moving picture is equal to or larger than a predetermined value when determining the change to a different reproduction speed during the reproduction;
reproducing the sound and the moving picture based on the input data and, when determining the change of the reproduction speed, changing over the reproduction speed at the changeover timing;
muting a sound output based on the sound signal at the changeover timing,
changing over the reproduction speed when the sound output is muted, and
canceling the mute within the predetermined period when the reproduction speed is changed over.

10. The non-transitory recording medium recorded with the sound signal control program according to claim 9, wherein if the degree of coincidence is equal to or larger than the predetermined value by making a comparison between the frames ranging from an Nth frame to an (N+x)th frame posterior to a predetermined frame counted from the Nth frame in the moving picture signal, a range from an (N+1)th frame to the (N+x)th frame is detected as the changeover timing.

11. The non-transitory recording medium recorded with the sound signal control program according to claim 9, wherein if the reproduction speed is changed to a 1× speed from the reproduction speed less than the 1× speed or to the 1× speed from the reproduction speed exceeding the 1× speed, the sound output is muted.

12. The non-transitory recording medium recorded with the sound signal control program according to claim 9, further comprising:
detecting missing data of the input data; and
generating substitute data, when the missing data of the input data is detected, by averaging the input data which exclude data containing the missing data being detected,
wherein the substitute data is output for a reproduction time duration obtained by adding the reproduction time duration of the input data used for the averaging to the reproduction time duration of the data with the missing data being detected, when the missing of the input data is detected, determining a change to the reproduction speed less than the 1× speed, according to a proportion of the number of data used for averaging and the number of substitute data, and when coming to detect none of the missing data of the input data, a change to the 1× reproduction speed is determined.

* * * * *

UNITED STATES PATENT AND TRADEMARK OFFICE
CERTIFICATE OF CORRECTION

PATENT NO. : 8,634,697 B2
APPLICATION NO. : 12/727508
DATED : January 21, 2014
INVENTOR(S) : Ohbitsu Page 1 of 1

It is certified that error appears in the above-identified patent and that said Letters Patent is hereby corrected as shown below:

On the Title Page Item [73] (Assignee), Line 1, delete "Futjitsu" and insert -- Fujitsu --, therefor.

In the Claims

Column 19, Line 24, In Claim 4, after "by averaging units of the input" insert -- data --.

Signed and Sealed this
First Day of July, 2014

Michelle K. Lee
*Deputy Director of the United States Patent and Trademark Office*